United States Patent
Schaffer

Patent Number: 6,120,010
Date of Patent: Sep. 19, 2000

[54] AIR VALVE ADAPTER

[76] Inventor: Brian J. Schaffer, 725 S. 12 St. #52, Bismarck, N. Dak. 58504

[21] Appl. No.: 09/109,713

[22] Filed: Jul. 2, 1998

[51] Int. Cl.[7] .................................................. F16F 9/43
[52] U.S. Cl. ............................................... 267/64.28
[58] Field of Search ........................ 285/334.4, 333, 285/390; 267/DIG. 1, 64.28; 137/232, 231, 223

[56] References Cited

U.S. PATENT DOCUMENTS

| | | | |
|---|---|---|---|
| 954,549 | 4/1910 | Turner | 285/334.4 |
| 1,237,249 | 8/1917 | Goodall | 285/334.4 |
| 2,098,669 | 11/1937 | Moffitt | 285/334.4 |
| 2,646,996 | 7/1953 | Parmesan | 285/334.4 |
| 3,595,552 | 7/1971 | Nicholls | 267/64.28 |
| 5,181,977 | 1/1993 | Gneiding et al. | 152/429 |
| 5,823,579 | 10/1998 | Mackay | 285/93 |

*Primary Examiner*—Robert J. Obertleitner
*Assistant Examiner*—Devon Kramer

[57] ABSTRACT

A new air valve adapter for permitting connection of a standard tire air valve to the threaded air fitting of an air shock absorber. The inventive device includes a casing having first and second ends, an outer surface and an inner surface. The inner surface of the casing defines a central bore through the casing which extends between the first and second ends of the casing. The inner surface of the casing has a first threaded portion and a second threaded portion. The first threaded portion is positioned adjacent the first end of the casing. The second threaded portion is positioned adjacent the second end of the casing. The first threaded portion of the inner surface of the casing is designed for threadably engaging a threaded root end of an air valve inserted through the first end of the casing into the bore of the casing. The second threaded portion of the inner surface of the casing is designed for threadably engaging a threaded air fitting of an air shock absorber inserted through the second end of the casing into the bore of the casing to connect the air valve to the air fitting.

5 Claims, 3 Drawing Sheets

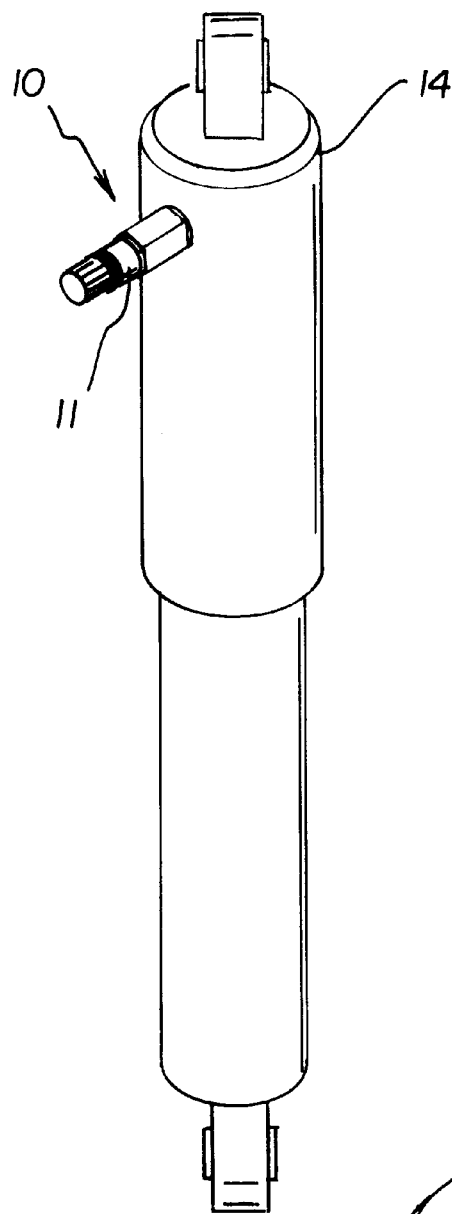
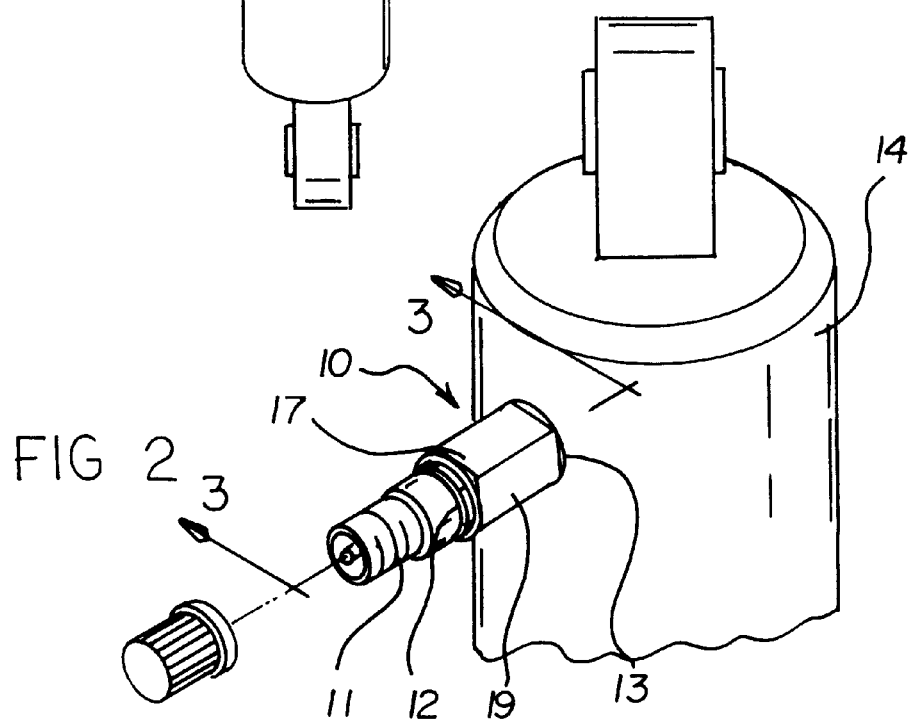

AIR VALVE ADAPTER

BACKGROUND OF THE INVENTION

1. Field of the Invention

The present invention relates to air valve adapters and more particularly pertains to a new air valve adapter for permitting connection of a standard tire air valve to the threaded air fitting of an air shock absorber.

2. Description of the Prior Art

The use of air valve adapters is known in the prior art. More specifically, air valve adapters heretofore devised and utilized are known to consist basically of familiar, expected and obvious structural configurations, notwithstanding the myriad of designs encompassed by the crowded prior art which have been developed for the fulfillment of countless objectives and requirements.

Known prior art air valve adapters include U.S. Pat. No. 5,509,438; U.S. Pat. No. 5,121,780; U.S. Pat. No. 4,445,527; U.S. Pat. No. 3,994,312; U.S. Pat. No. 3,067,770; and U.S. Pat. No. 2,862,539.

While these devices fulfill their respective, particular objectives and requirements, the aforementioned patents do not disclose a new air valve adapter. The inventive device includes a casing having first and second ends, an outer surface and an inner surface. The inner surface of the casing defines a central bore through the casing which extends between the first and second ends of the casing. The inner surface of the casing has a first threaded portion and a second threaded portion. The first threaded portion is positioned adjacent the first end of the casing. The second threaded portion is positioned adjacent the second end of the casing. The first threaded portion of the inner surface of the casing is designed for threadably engaging a threaded root end of an air valve inserted through the first end of the casing into the bore of the casing. The second threaded portion of the inner surface of the casing is designed for threadably engaging a threaded air fitting of an air shock absorber inserted through the second end of the casing into the bore of the casing to connect the air valve to the air fitting.

In these respects, the air valve adapter according to the present invention substantially departs from the conventional concepts and designs of the prior art, and in so doing provides an apparatus primarily developed for the purpose of permitting connection of a standard tire air valve to the threaded air fitting of an air shock absorber.

SUMMARY OF THE INVENTION

In view of the foregoing disadvantages inherent in the known types of air valve adapters now present in the prior art, the present invention provides a new air valve adapter construction wherein the same can be utilized for permitting connection of a standard tire air valve to the threaded air fitting of an air shock absorber.

The general purpose of the present invention, which will be described subsequently in greater detail, is to provide a new air valve adapter apparatus and method which has many of the advantages of the air valve adapters mentioned heretofore and many novel features that result in a new air valve adapter which is not anticipated, rendered obvious, suggested, or even implied by any of the prior art air valve adapters, either alone or in any combination thereof.

To attain this, the present invention generally comprises a casing having first and second ends, an outer surface and an inner surface. The inner surface of the casing defines a central bore through the casing which extends between the first and second ends of the casing. The inner surface of the casing has a first threaded portion and a second threaded portion. The first threaded portion is positioned adjacent the first end of the casing. The second threaded portion is positioned adjacent the second end of the casing. The first threaded portion of the inner surface of the casing is designed for threadably engaging a threaded root end of an air valve inserted through the first end of the casing into the bore of the casing. The second threaded portion of the inner surface of the casing is designed for threadably engaging a threaded air fitting of an air shock absorber inserted through the second end of the casing into the bore of the casing to connect the air valve to the air fitting.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new air valve adapter apparatus and method which has many of the advantages of the air valve adapters mentioned heretofore and many novel features that result in a new air valve adapter which is not anticipated, rendered obvious, suggested, or even implied by any of the prior art air valve adapters, either alone or in any combination thereof.

It is another object of the present invention to provide a new air valve adapter which may be easily and efficiently manufactured and marketed.

It is a further object of the present invention to provide a new air valve adapter which is of a durable and reliable construction.

An even further object of the present invention is to provide a new air valve adapter which is susceptible of a low cost of manufacture with regard to both materials and labor, and which accordingly is then susceptible of low prices of sale to the consuming public, thereby making such air valve adapter economically available to the buying public.

Still yet another object of the present invention is to provide a new air valve adapter which provides in the apparatuses and methods of the prior art some of the advantages thereof, while simultaneously overcoming some of the disadvantages normally associated therewith.

Still another object of the present invention is to provide a new air valve adapter for permitting connection of a standard tire air valve to the threaded air fitting of an air shock absorber.

Yet another object of the present invention is to provide a new air valve adapter which includes a casing having first and second ends, an outer surface and an inner surface. The inner surface of the casing defines a central bore through the casing which extends between the first and second ends of the casing. The inner surface of the casing has a first threaded portion and a second threaded portion. The first threaded portion is positioned adjacent the first end of the casing. The second threaded portion is positioned adjacent the second end of the casing. The first threaded portion of the inner surface of the casing is designed for threadably engaging a threaded root end of an air valve inserted through the first end of the casing into the bore of the casing. The second threaded portion of the inner surface of the casing is designed for threadably engaging a threaded air fitting of an air shock absorber inserted through the second end of the casing into the bore of the casing to connect the air valve to the air fitting.

Still yet another object of the present invention is to provide a new air valve adapter that allows the threaded attachment of a standard tire air valve, such as a Schraeder valve, with one pitch of threads on to the threaded air fitting of an air shock absorber which has a different pitched high pressure threads thereon.

Even still another object of the present invention is to provide a new air valve adapter that allows a user to easily fill an air shock absorber from the fitted air fitting of the air shock absorber with out having to install expensive air lines which have additional problems (which the air valve adapter does not have) of leaking from rubbing on hot exhaust parts and from wetting of the line.

Still yet another object of the present invention is to provide a new air valve adapter that allows a user to inflate air shocks on a vehicle to different amounts individually, thus permitting custom inflation of air shock absorbers which is not possible with conventional prior art air lines for air shock absorbers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new air valve adapter in use according to the present invention.

FIG. 2 is a schematic partial perspective view of the present invention in use.

DESCRIPTION OF THE PREFERRED EMBODIMENT

Figure 3:
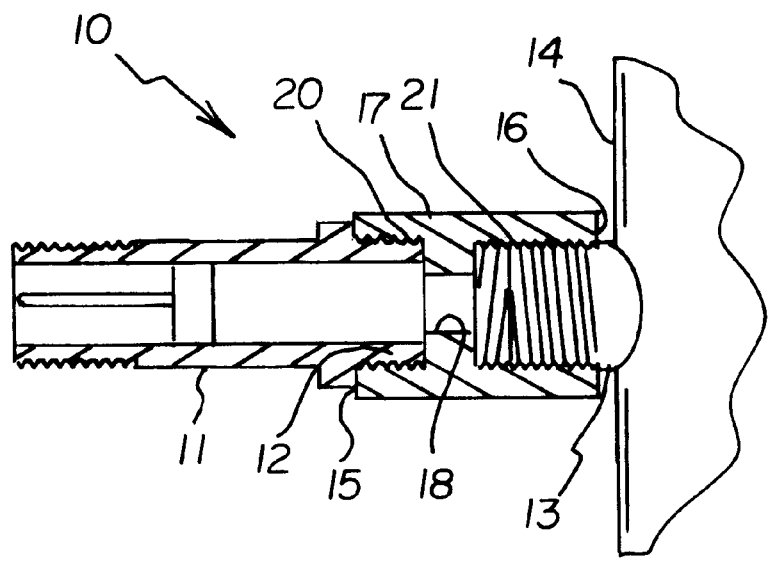
FIG. 3 is a schematic cross sectional view of the present invention in use taken from line 3—3 on FIG. 2.
Figure 4:
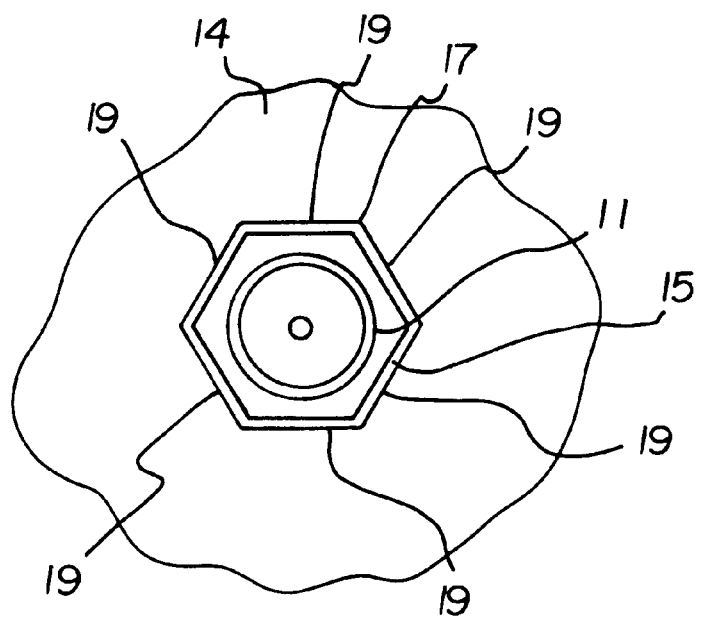
FIG. 4 is a schematic end view of the present invention in use.
Figure 5:
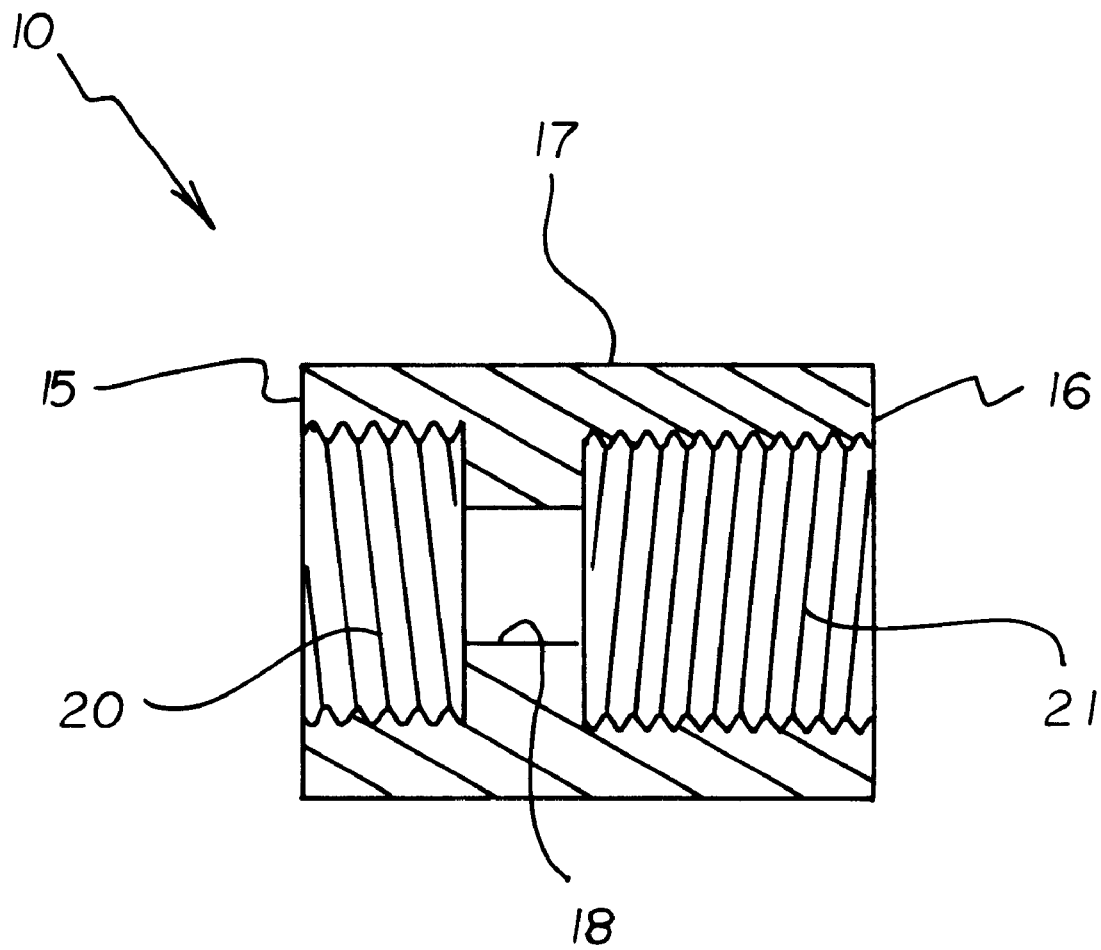
FIG. 5 is a schematic cross sectional view of the present invention.

With reference now to the drawings, and in particular to FIGS. 1 through 5 thereof, a new air valve adapter embodying the principles and concepts of the present invention and generally designated by the reference numeral 10 will be described.

As best illustrated in FIGS. 1 through 5, the air valve adapter 10 generally comprises a casing 10 having first and second ends 15,16, an outer surface 17 and an inner surface 18. The inner surface 18 of the casing 10 defines a central bore through the casing 10 which extends between the first and second ends 15,16 of the casing 10. The inner surface 18 of the casing 10 has a first threaded portion 20 and a second threaded portion 21. The first threaded portion 20 is positioned adjacent the first end 15 of the casing 10. The second threaded portion 21 is positioned adjacent the second end 16 of the casing 10. The first threaded portion 20 of the inner surface 18 of the casing 10 is designed for threadably engaging a threaded root end 12 of an air valve 11 inserted through the first end 15 of the casing 10 into the bore of the casing 10. The second threaded portion 21 of the inner surface 18 of the casing 10 is designed for threadably engaging a threaded air fitting 13 of an air shock absorber 14 inserted through the second end 16 of the casing 10 into the bore of the casing 10 to connect the air valve 11 to the air fitting 13.

In use, the air valve adapter 10 is designed for permitting attachment of the threaded root end 12 of a tire-type air valve 11, such as a Schraeder valve, to a threaded air fitting 13 of an air shock absorber 14. The root end 12 of the air valve 11 has threads having a pitch different than the automotive high pressure pitch of the threads of the air fitting 13. This makes it impossible to directly thread the air valve 11 on to the air fitting 13 thereby causing the need for the air valve adapter 10. The casing 10 of the air valve adapter has first and second ends 15,16, an outer surface 17 and an inner surface 18. The casing 10 has a longitudinal axis extending between the first and second ends 15,16 of the casing 10. The inner surface 18 of the casing 10 defines a central bore through the casing 10 extending between the first and second ends 15,16 of the casing 10. The central bore is coaxial with the longitudinal axis of the casing 10. The outer surface 17 of the casing 10 has a generally polygonal cross section taken perpendicular to the longitudinal axis of the casing 10 so that the outer surface 17 of the casing 10 has a plurality of sides 19. Preferably, the cross section the outer surface 17 of the casing 10 is a hexagon so that the outer surface 17 of the casing 10 has six sides 19. In use, the sides 19 of the outer surface 17 permit engagement to a wrench so that a user may tighten or loosen the air valve 11 adapter from the threaded air fitting 13 of the air shock absorber 14.

The inner surface 18 of the casing 10 has a first threaded portion 20 and a second threaded portion 21. The first threaded portion 20 is positioned adjacent the first end 15 of the casing 10. The second threaded portion 21 is positioned adjacent the second end 16 of the casing 10. The first threaded portion 20 of the inner surface 18 of the casing 10 is designed for threadably engaging a threaded root end 12 of a tire type air valve 11 inserted through the first end 15 of the casing 10 into the bore of the casing 10. The first threaded portion 20 of the inner surface 18 of the casing 10 has threads of a first pitch complementary to the first pitch of the threads of the root end 12 of the air valve 11. The second threaded portion 21 of the inner surface 18 of the casing 10 is designed for threadably engaging a threaded air fitting 13 of an air shock absorber 14 inserted through the second end 16 of the casing 10 into the bore of the casing 10. The second threaded portion 21 of the inner surface 18 of the casing 10 has threads of a second pitch complementary to the second pitch of the threads of the air fitting 13 of the air shock absorber 14.

The casing 10 has a length defined between the first and second ends 15,16 of the casing 10 which is ideally about 2 inches. The casing 10 has an outer width defined perpendicular to the longitudinal axis of the casing 10 which is ideally about ¾ inch. In this ideal embodiment, the casing 10 comprises brass. Optionally, the casing 10 may comprise a rigid plastic.

In use, the air fitting is threadably inserted through the second end of said casing into the central bore of the casing. The root end of an air valve is threadably inserted through the first end of the casing into the central bore to connect the air valve to the air fitting. The air shock absorber may then be easily filled with air from a conduit attached to the air valve.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. In combination:
   a tire type air valve having a root end with an external thread of a first pitch;
   an air filled shock absorber having an air fitting with an external thread of a second pitch; and
   an air valve adapter connecting the air valve to the air fitting of the air filled shock absorber, said air valve adapter comprising:
   a casing having first and second ends, an outer surface and an inner surface, said casing having a longitudinal axis extending between said first and second ends of said casing, said inner surface of said casing defining a central bore through said casing extending between said first and second ends of said casing, said central bore being coaxial with said longitudinal axis of said casing;
   said outer surface of said casing having a generally polygonal cross section taken perpendicular to said longitudinal axis of said casing, said outer surface of said casing having a plurality of sides, wherein said cross section said outer surface of said casing comprises a hexagon, and wherein said plurality of sides of said outer surface of said casing comprises six sides;
   said inner surface of said casing having a first threaded portion and a second threaded portion, said first threaded portion being positioned adjacent said first end of said casing, said second threaded portion being positioned adjacent said second end of said casing;
   said first threaded portion of said inner surface of said casing being adapted for threadably engaging a threaded root end of an air valve inserted through said first end of said casing into said bore of said casing, said first threaded portion of said inner surface of said casing having threads of a first pitch complementary to the first pitch of the threads of the root end of the air valve;
   said second threaded portion of said inner surface of said casing being adapted for threadably engaging a threaded air fitting of an air shock absorber inserted through said second end of said casing into said bore of said casing, said second threaded portion of said inner surface of said casing having threads of a second pitch complementary to the second pitch of the threads of the air fitting of the air shock absorber; and
   a throat portion extending inwardly from said inner surface of said casing, said throat portion being positioned between said first and second ends of said casing, said throat portion having a diameter smaller than a diameter of said inner surface of said casing for compressing an air flow from said second end to said first end.

2. The air valve adapter of claim 1, wherein said casing comprises a plastic.

3. The air valve adapter of claim 1, wherein said casing comprises brass.

4. The air valve adapted of claim 1, wherein said casing has an outer width defined perpendicular to said longitudinal axis of said casing, said outer width of said casing being about ¾ inch.

5. The air valve adapter of claim 1, wherein said casing has a length defined between said first and second ends of said casing, said length of said casing being about 2 inches.

* * * * *